(12) United States Patent
Smith et al.

(10) Patent No.: US 10,107,675 B2
(45) Date of Patent: Oct. 23, 2018

(54) MOTOR FAULT DETECTION SYSTEM AND METHOD

(71) Applicant: Numerex Corp., Atlanta, GA (US)

(72) Inventors: Jeffrey O. Smith, Dallas, TX (US); Rodney C. Montrose, Allen, TX (US)

(73) Assignee: Numerex Corp., Atlanta, GA (US)

( * ) Notice: Subject to any disclaimer, the term of this patent is extended or adjusted under 35 U.S.C. 154(b) by 487 days.

(21) Appl. No.: 14/830,574

(22) Filed: Aug. 19, 2015

(65) Prior Publication Data

US 2017/0052059 A1    Feb. 23, 2017

(51) Int. Cl.
  *G06F 19/00*     (2018.01)
  *G01H 1/00*      (2006.01)
  *H04W 4/00*      (2018.01)

(52) U.S. Cl.
  CPC .............. *G01H 1/003* (2013.01); *H04W 4/00* (2013.01)

(58) Field of Classification Search
  CPC ................. B60L 11/1864; B60L 2240/545
  USPC ................................... 702/182–185
  See application file for complete search history.

(56) References Cited

U.S. PATENT DOCUMENTS

| 2013/0201316 A1* | 8/2013 | Binder ................. H04L 67/12 348/77 |
| 2014/0079564 A1* | 3/2014 | Becerra ............. F04D 15/0066 417/53 |

\* cited by examiner

*Primary Examiner* — Edward Raymond
(74) *Attorney, Agent, or Firm* — King & Spalding

(57) ABSTRACT

A system and method are described that can remotely track and monitor real-time parameters of electric motors and/or machines. Data such as vibration, temperature, current, location and more can be tracked regarding electric motors and/or machines in factories or other plant locations. The data can be aggregated and compared with failure data. The data can then be used to predict and prevent future failures or to make other predictions that will be helpful regarding servicing and repairs.

20 Claims, 5 Drawing Sheets

500

| TIME | MACHINE ID | MOTOR ID | VIBRATION (Hz) | TEMP (°C) | CURRENT (AMP) |
|---|---|---|---|---|---|
| 1 | 0124 | 05 | 50 | 20 | 40 |
| 2 | 0124 | 05 | | | 30 |
| 3 | 0124 | 05 | | | 33 |
| 4 | 0124 | 05 | | | 31 |
| 5 | 0124 | 05 | 51 | 19 | 42 |
| 6 | 0124 | 05 | | | 27 |
| 7 | 0124 | 05 | | | 40 |
| 8 | 0124 | 05 | | | 35 |
| 9 | 0124 | 05 | | | 36 |
| 10 | 0124 | 05 | 53 | 24 | 30 |
| 11 | 0124 | 05 | | | 41 |
| 12 | 0124 | 05 | | | 42 |
| 13 | 0124 | 05 | | | 30 |
| ⋮ | ⋮ | ⋮ | ⋮ | ⋮ | ⋮ |

FAILURE DATA

| AGE (Yr) | MACHINE ID | MOTOR ID | VIBRATION (Hz) | TEMP (°C) | CURRENT (AMP) | PRESSURE (Pa) |
|---|---|---|---|---|---|---|
| 5.4 | 0125 | 05 | 200 | 22 | 40 | 101,000 |
| 6.1 | 0002 | 05 | 50 | 35 | 30 | 102,000 |
| 6.3 | 0016 | 05 | 103 | 10 | 20 | 103,122 |
| 4.7 | 0223 | 05 | 111 | 5 | 15 | 105,100 |
| 7.8 | 0511 | 05 | 73 | 17 | 33 | 103,001 |
| ⋮ | ⋮ | ⋮ | ⋮ | ⋮ | ⋮ | ⋮ |

*FIG. 7*

MOTOR FAULT DETECTION SYSTEM AND METHOD

TECHNICAL FIELD

The present disclosure is directed to machine and factory management, and more particularly to the monitoring of motors and engines.

BACKGROUND OF THE INVENTION

Certain companies or entities manage large fleets of electric motors, machines, and manufacturing tools. These items can be located in various factories, mines, warehouses, mail centers and other locations. For example a company may have various factories around the world, all of which use a certain electric motor to manufacture toys. The service and repair issues for these machines will be similar. However, the company may have to send repairmen in response to failures instead of being able to predict ahead of time when failures will happen.

Other companies may manage various different machines for various purposes. Here again, the company's machines will need servicing and repairs from time to time. Typically the company can only react to failures and problems and cannot act proactively or ahead of time to fix problems.

BRIEF SUMMARY OF THE INVENTION

One embodiment of the teachings of the present disclosure is a motor monitoring system comprising: a plurality of sensor units attached to a plurality of electric motors, the plurality of sensor units comprising a vibration sensor, a processor, and a radio interface; and a plurality of servers, the plurality of servers operable to receive communications from the plurality of sensor units, and operable to store data regarding an electric motor's identification and vibration data.

Another embodiment is a motor monitoring system comprising: a plurality of sensor units attached to a plurality of electric motors, the plurality of sensor units comprising a processor, the processor coupled to a vibration sensor, an accelerometer, a GPS module, a current sensor, and a radio interface, the processor operable to communicate data from the sensors and modules over the radio interface; and a plurality of servers, the plurality of servers operable to receive data from the plurality of sensor units and operable to correlate the data with electric motor identification data and use the data to analyze failures.

A further embodiment comprises a method for monitoring a plurality of electric motors, comprising: receiving, at a server, data obtained from a plurality of sensor units attached to the plurality of electric motors, the plurality of sensor units comprising a vibration sensor, a processor, and a radio interface; storing, in a database, the data received from the plurality of sensor units; receiving, at a server, failure data regarding the plurality of electric motors; and comparing, at a database, failure data and sensor unit data to predict future electric motor failures.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 6 is a diagram of an embodiment of a data record utilizing the present disclosure.

FIG. 7 is a diagram of an embodiment of a data record utilizing the present disclosure.

DETAILED DESCRIPTION OF THE INVENTION

The present disclosure includes teachings to assist in the monitoring and tracking of electric motors. Often a company with a large manufacturing business will have to manage and service a wide variety of electric motors across a variety of plant or factory locations. When these machines break down the company will have to reactively send out a repairman or perform some other form of servicing. The present disclosure includes teachings regarding sensor units that can be mounted on a company's electric motors to collect and send data that can be used to measure and predict factors leading to motor failure. The sensor units can include vibration sensors, temperature sensors and other type of sensors that a company wishes to use. While many embodiments described herein will comprise electric motors, the teachings can be applicable to a variety of industrial machines.

Typical failures on electric motors include: heat, power supply anomalies, humidity, contamination, improper lubrication, and unusual mechanical loads. Common causes of these failures include bearing, stator winding, external, rotor bar, and shaft coupling. As data is collected across multiple physical plant locations and multiple electric motors, patterns that are predictive of failure can be determined. Types of failures can be predicted and planned for ahead of time. Furthermore, when the type of failure is known beforehand, the owner can decide between repair and replacement, and which will be more economical. Other options could include modifications or updates of various types to assist an electric motor or machine to function better. The failure of modifications or accessories can also be detected by sensor units.

Figure 1:
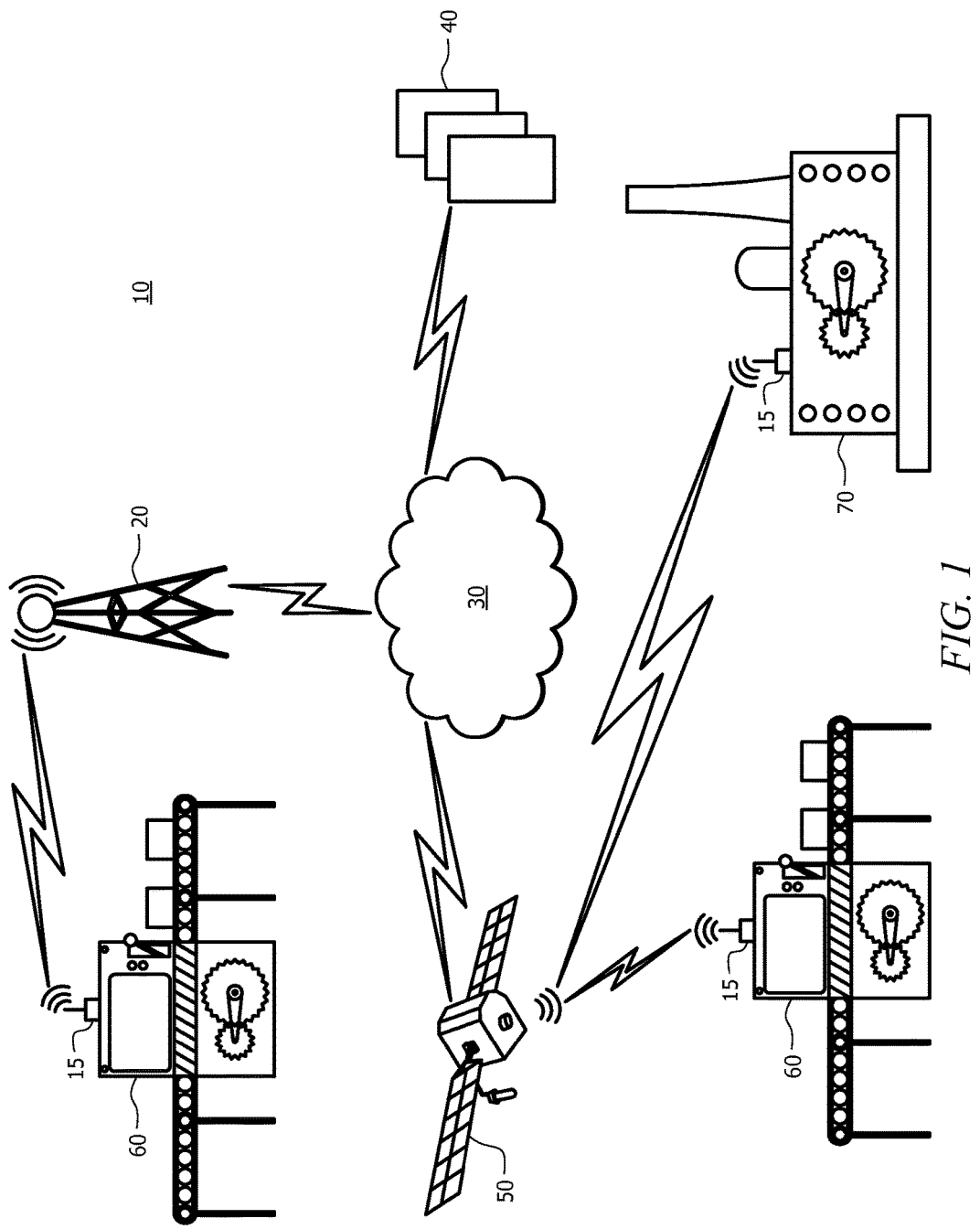
FIG. 1 is a diagram of a system embodiment of the present disclosure.

Referring now to FIG. 1, an embodiment of the teachings of the present disclosure is shown. System 10 comprises a first electric motor 60 and a second electric motor 70 that are used in some type of industrial or manufacturing process. Electric motors 60 and 70 both comprise a motor of some type. Sensor unit 15 is attached to electric motors 60 and 70, possibly to the engine or motor block, although it can be located elsewhere on the electric motor body. Sensor units 15 include a plurality of sensors such as vibration and pressure sensors, and a radio interface. The radio interface can communicate over one or more of cellular network 20, satellite network 50, or another network. Telecommunications network 30, such as the internet, connects sensors units 15, cellular network 20, satellite network 50, or other networks to servers 40. Servers 40 receive data from sensor units 15 regarding vibration levels, pressure or other data. Servers 40 can then aggregate the data according to motor or machine ID. Electric motors 60 and 70 will have different electric motor IDs and may use the same motor or different motors. Servers 40 can aggregate and distinguish data based on machine ID and motor ID to analyze data by machine and motor. Data regarding failure can be received at the servers 40 from the sensor units 15 or the data can be input manually. As failure and other data is aggregated and organized by machine and motor, the company managing the electric motors can begin to find patterns or warning signs of failure. This information can then be used to save costs by adjusting how machines or motors are used, being able to select more reliable machinery for purchase and use, and being able to predict failure and efficiently use the time of man power for repairs and servicing.

In practice, embodiments of the servers and/or data records may maintain a list of operating characteristics for each electric motor being tracked. Normal operating values for a given electric motor may include a normal vibration value, humidity level, temperature, and current. As time goes on, the servers may detect aberrational values and can then learn from how the aberrational values lead to failures. The servers can determine normal operating values for a given type or class of electric motors, when similar models are expected to operate in the same way. The servers can then collect normal operating values for various classes of electric motors, which will be helpful in analyzing and predicting failures across a company's fleet of electric motors and other machines.

Figure 2:
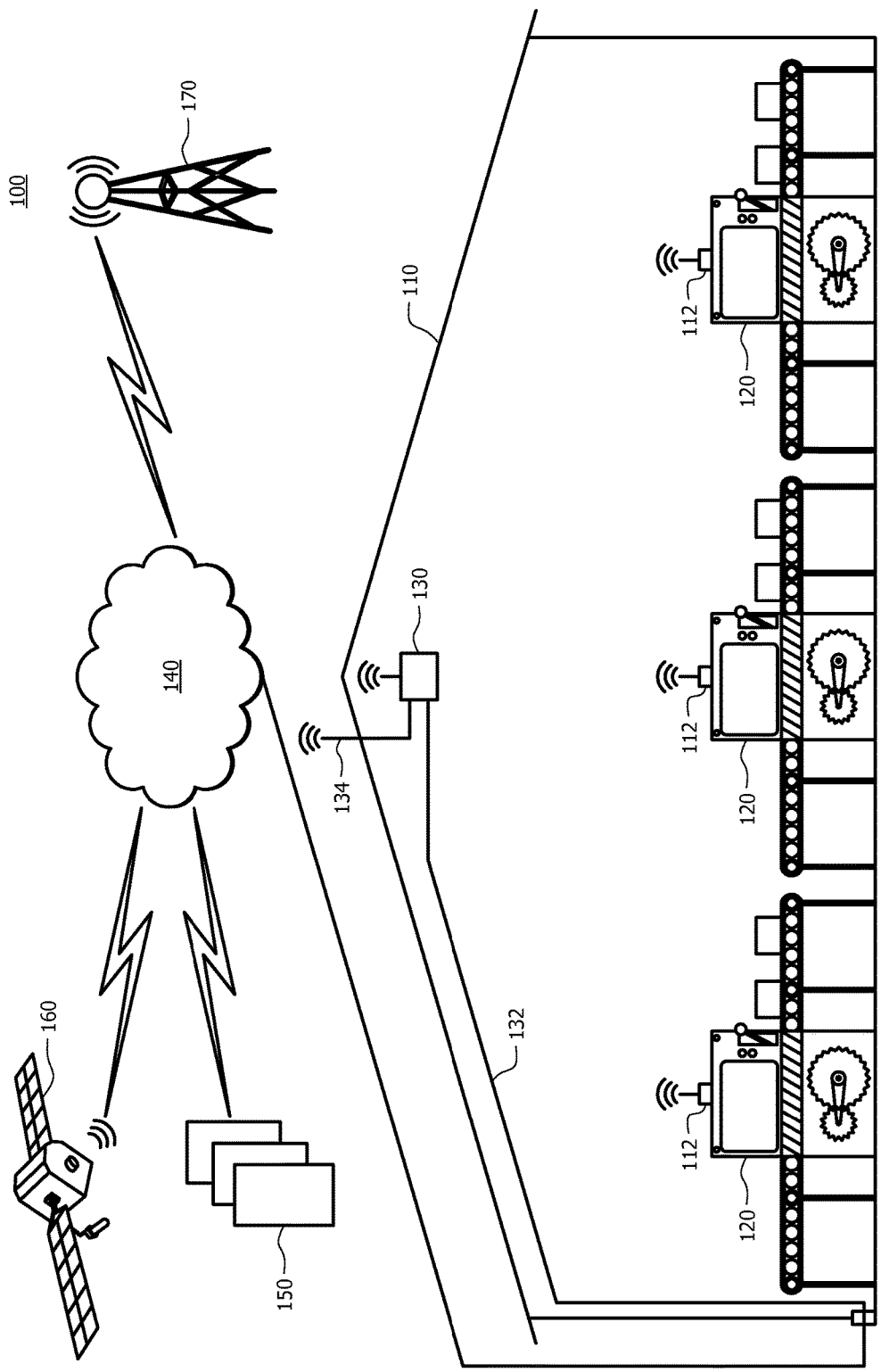
FIG. 2 is a diagram of a system embodiment of the present disclosure.

FIG. 2 shows an alternative embodiment of the present disclosure. System 100 includes a warehouse/factory 110 with a plurality of electric motors 120 inside. Electric motors 120 can be any type of industrial or manufacturing machine and each machine comprises a sensor unit 112. Sensor unit 112 can be attached to the motor of machine 120 or attached at another location on electric motor 120. In this embodiment the sensor units 112 communicate with a communication hub 130. Hub 130 then sends the received data to servers 150 by means of a hardline connection 132 or radio interface 134 over cellular network 170 or satellite network 160. Any other appropriate communication means can be used. In a preferred embodiment sensor units 112 communicate with hub 130 over a Wi-Fi connection, however other means such as Bluetooth, cellular or other communication standards can be used. This embodiment may be particularly helpful when use of a cellular network by sensor units 112 may not be practical. Warehouse/factory 110 can also contain various types of electric motors with various types of motors, any of which could comprise a sensor unit 112 and communicate with hub 130 and servers 150. Servers 150 can be located at the company's headquarters, IT or tech center, or servers 150 could be managed by a third party facilities management entity.

Figure 3:
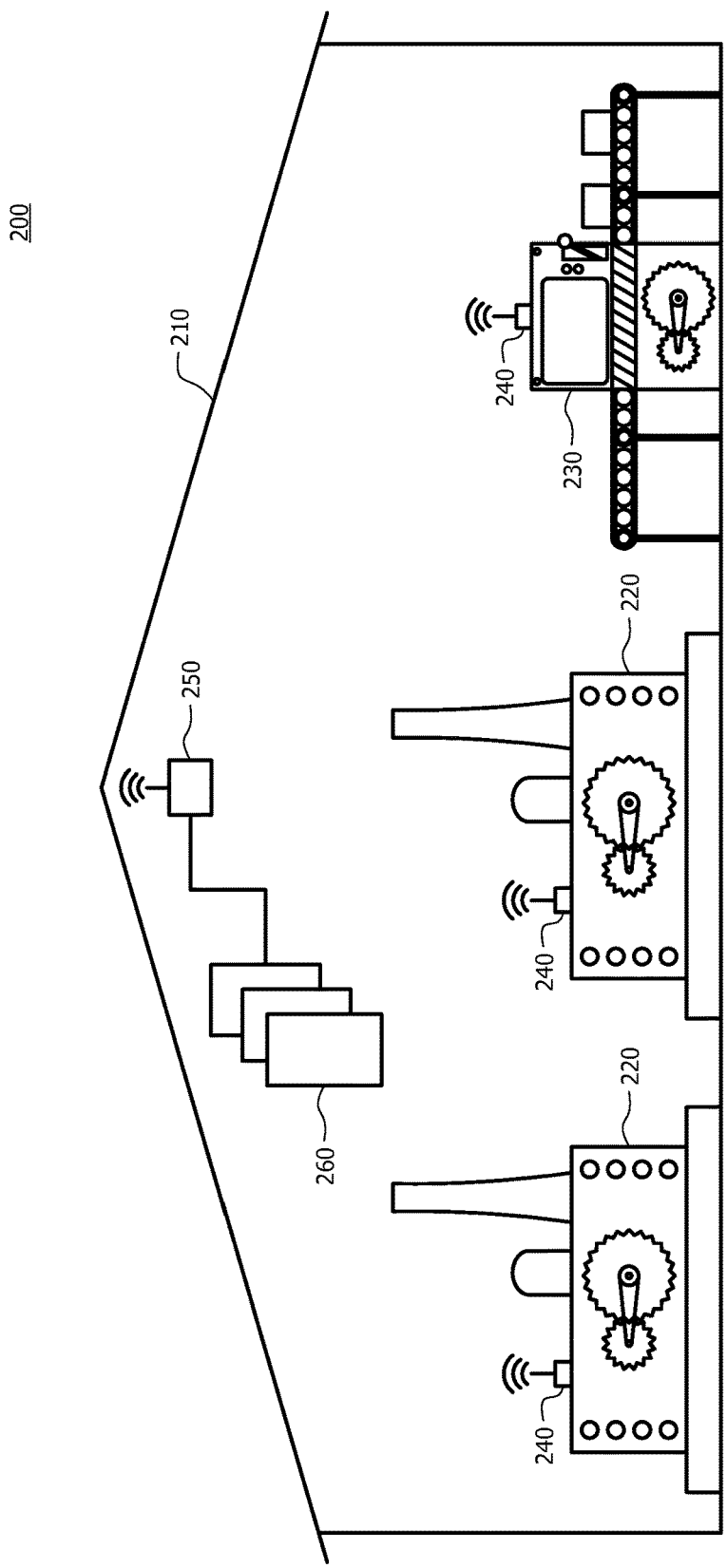
FIG. 3 is a diagram of a system embodiment of the present disclosure utilizing a communication hub.

FIG. 3 shows an alternative embodiment of a warehouse 210 with electric motors 220 and 230. Each electric motor has a sensor unit 240 that communicates with a hub 250. In this embodiment, the servers 260 that store and analyze the data from the sensor units are servers located on the same premises. In this embodiment the data collected at the communication hub 250 does not have to be transmitted over another telecommunications network. Alternatively, servers 260 can be used to analyze local data before being sent to another location for further processing or aggregation with other data.

Figure 4:
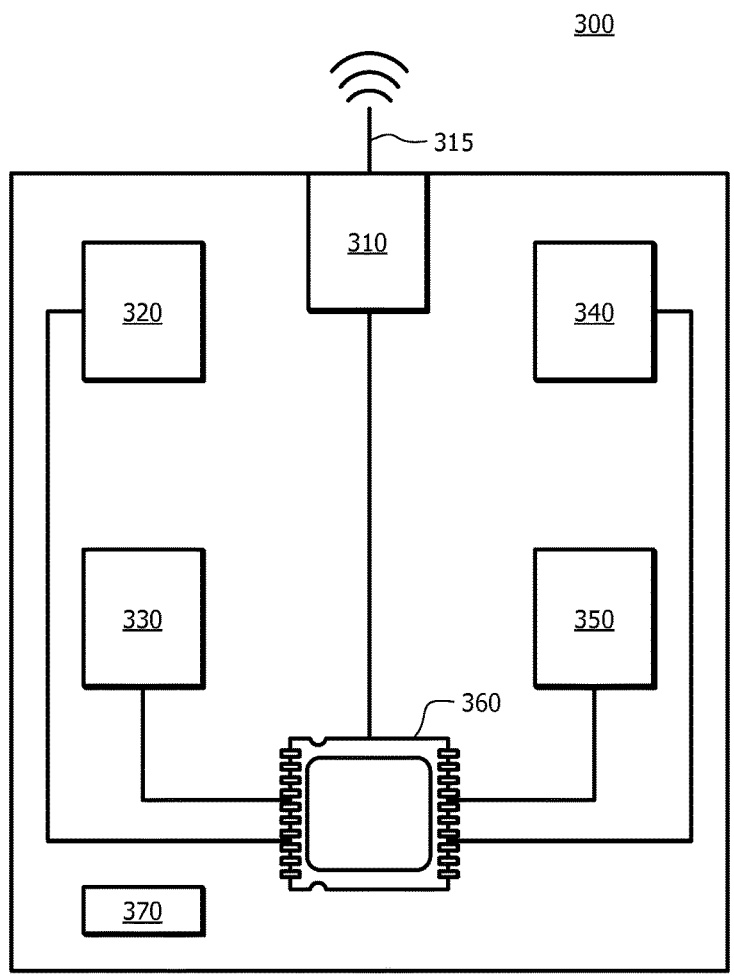
FIG. 4 is a diagram of an embodiment of a sensor unit of the present disclosure.

FIG. 4 shows an embodiment of a sensor unit 300 according to the present disclosure. Sensor unit 300 can be installed on an electric motor, engine block or other position to make measurements of industrial or manufacturing machinery. Sensor unit 300 comprises a plurality of sensors: temperature sensor 320, vibration sensor 330, accelerometer 340, and one or more current sensors 350 (typically one per phase). The sensors connect to a processor 360. Radio interface 310 and antenna 315 allow the sensor unit 300 to communicate over a wireless network to report data to the fleet owner. Radio interface 310 can be cellular (3G, 4G, CDMA, GSM, etc.), Wi-Fi, satellite or another system. Radio interface 310 can also include GPS or another location determination system. Location determination can also be provided by a wireless network such as 3G or 4G. In some embodiments sensor unit 300 may use a hardline connection to communicate with the internet or other communication systems. Power supply 370 powers the sensor unit 300. Power supply 370 can be any type of battery such as lithium ion or it can be an alternative energy source such as a solar panel, or it may draw power from the attached machinery. In some embodiments power supply 370 can be an AC power plug to a wall socket. A variety of sensors could be added to sensor unit 300 such as humidity sensors, voltage sensors, and more.

Processor 360 can send data on a periodic basis or continually to servers or databases run by the machinery owner or another entity tracking the sensor unit data. Temperature sensor 320 can collect temperature data. Vibration sensor 330 collects vibration data that can be collected whether the sensor unit 300 is installed directly on a motor or elsewhere on a machine. Software on the sensor unit 300 or at servers and databases collecting and storing sensor data will likely need to store the location (on the body of the electric motor) of the vibration sensor 330 so that vibration data can be appropriately interpreted. Accelerometer 340 can detect movements and orientation of the sensor unit 300. Current sensor (or ohmmeter) 350 can detect electrical current or resistance. Current sensor(s) 350 can measure the electrical currents flowing in each phase to the motor. Current sensor 350 may need to be installed over an electrical line on an electric motor. Or sensor 350 can measure elsewhere, such as reading from a variable frequency drive (VFD). Current sensor 350 can then analyze and measure electrical behaviors of the electric motor.

Alternative embodiments of sensor unit 300 may use more or fewer sensors. For example, certain embodiments of sensor unit 300 may lack a temperature sensor because the owner does not wish to track temperature or for cost reasons. Other embodiments of sensor unit 300 may include additional sensors, such as a pressure sensor, piezoelectric sensor or others. Some sensors may be combined. For example, acceleration can be measured by either a vibration sensor or a piezoelectric sensor, or other types of sensors. In some embodiments the sensor unit may be removable from an electric motor and plugged into a holster. The holster may be used to download data from the sensor unit or possibly to recharge a power source. A holster may also be used to provide updated software. Other embodiments may be able to update sensor unit software by an over the air transmission.

Figure 5:
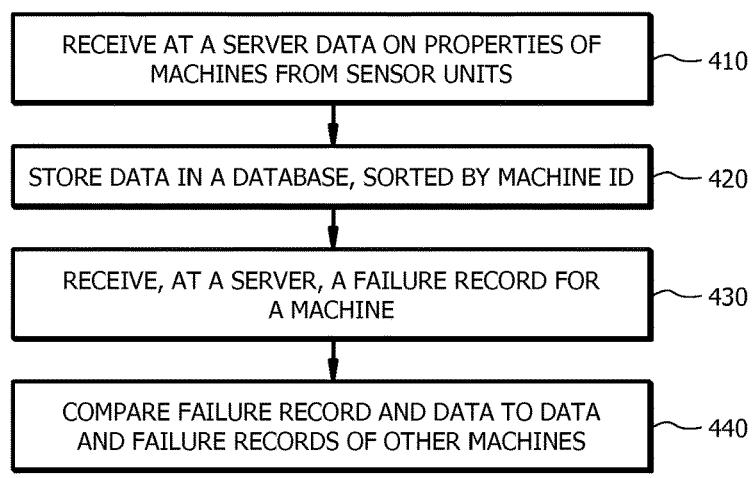
FIG. 5 is a flow chart diagram of a process embodiment of the present disclosure.

FIG. 5 shows an embodiment of a method of practicing the present disclosure. Data from sensor units is received at a server 410. The data is stored in a database according to machine and/or motor ID 420. A failure record is then received at a server regarding the failure of a machine and/or motor 430. The failure records and other data are then combined, compared and/or aggregated with other failure records and data on other machines and/or motors 440.

FIG. 6 displays a possible embodiment of a data record 500 regarding an electric motor. Data record 500 can embody a data record as sent by a sensor unit and/or a data record as stored by a database. Typically a data record 500 will comprise a machine and motor ID so that the data can be arranged and analyzed by machine or motor. Data record 500 can also comprise a plurality of data such as vibration, temperature, and pressure. More or fewer data fields may be desired for any given user's choices. The time step may be adjusted according to the user's wishes. Data could be reported/stored on a per second basis, per minute, daily or other preferred setting. Data can be formatted in a user's preferred format such as Microsoft Excel, SAP, SQLite or another format.

FIG. 7 displays a possible embodiment of data sorted to analyze mechanical failures in a particular motor type. Data set 700 contains data from numerous machine IDs that each use an engine ID 05. Data such as motor age, vibration, temperature, current, and pressure are collected at time of failure to help determine if one of these factors led to the failure. For example, if the entity can see that motors consistently fail under high temperature and high vibration conditions, then efforts can be made to avoid such conditions. If that is not possible then a new type of motor or machine may need to be chosen. Data on vibration, temperature and other factors can be collected from the moment of failure, or can be averaged over the past day or week of the motor's life before failure (or any other time period).

Sensor units and systems implementing the teachings of the present disclosure can use a variety of telecommunications networks to communicate and report data. Sensor units may include radio interfaces for cellular, satellite, Wi-Fi or other telecommunications standards. One or more of these may be used by the sensor unit depending on user preference or capabilities. Sensor units may choose a network depending on what networks are available, or lowest cost. Preferably, the sensor units will be capable of two-way communication, such that a manager can remotely turn off the sensor unit or make other settings changes.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A motor monitoring system comprising:
a plurality of sensor units attached to and mounted on a body of a plurality of electric motors, the plurality of sensor units comprising a vibration sensor, a GPS module, a processor, and a radio interface; and
a plurality of servers, the plurality of servers operable to receive communications from the plurality of sensor units, and operable to store data regarding an identification of at least one electric motor of the plurality of electric motors and vibration data of the at least one electric motor of the plurality of electric motors.

2. The system of claim 1 wherein the radio interface is a cellular interface.

3. The system of claim 1 further comprising a communication hub, the communication hub operable to receive communications from the plurality of sensor units and forward the communications to the plurality of servers.

4. The system of claim 1 wherein the plurality of sensor units further comprise a temperature sensor.

5. The system of claim 1 wherein at least one of the plurality of sensor units is attached to an engine block of an electric motor of the plurality of electric motors.

6. The system of claim 1 wherein the plurality of sensor units are attached directly to the plurality of electric motors.

7. The system of claim 1 wherein the processor is operable to communicate data from the plurality of sensor units over the radio interface and wherein the plurality of servers are operable to correlate the data from the plurality of sensor units with the data regarding the identification of the plurality of electric motors to analyze failures.

8. A motor monitoring system comprising:
a plurality of sensor units attached to and mounted on a body of a plurality of electric motors, the plurality of sensor units comprising a vibration sensor, an accelerometer, a processor, and a radio interface; and
a plurality of servers, the plurality of servers operable to receive communications from the plurality of sensor units, and operable to store data regarding an identification of at least one electric motor of the plurality of electric motors and vibration data of the at least one electric motor of the plurality of electric motors.

9. The system of claim 8 further comprising a communication hub, the communication hub operable to receive communications from the plurality of sensor units and forward the communications to the plurality of servers.

10. The system of claim 8 wherein the plurality of sensor units further comprises a temperature sensor.

11. The system of claim 8 wherein the processor is operable to communicate data from the plurality of sensor units over the radio interface and wherein the plurality of servers are operable to correlate the data from the plurality of sensor units with the data regarding the identification of the plurality of electric motors to analyze failures.

12. A motor monitoring system comprising:
a plurality of sensor units attached to and mounted on a body of a plurality of electric motors, the plurality of sensor units comprising a vibration sensor, a current sensor, a processor, and a radio interface; and a plurality of servers, the plurality of servers operable to receive communications from the plurality of sensor units, and operable to store data regarding an identification of at least one electric motor of the plurality of electric motors and vibration data of the at least one electric motor of the plurality of electric motors.

13. The system of claim 12 wherein the processor is operable to communicate data from the plurality of sensor units over the radio interface and wherein the plurality of servers are operable to correlate the data from the plurality of sensor units with the data regarding the identification of the plurality of electric motors to analyze failures.

14. A motor monitoring system comprising:
a plurality of sensor units attached to a plurality of electric motors, the plurality of sensor units comprising a vibration sensor, a processor, and a radio interface; and
a plurality of servers, the plurality of servers operable to receive communications from the plurality of sensor units, and operable to store data regarding an identification of at least one electric motor of the plurality of electric motors and vibration data of the at least one electric motor of the plurality of electric motors, wherein the radio interface is a Bluetooth interface.

15. A motor monitoring system comprising:
a plurality of sensor units attached to a plurality of electric motors, the plurality of sensor units comprising a vibration sensor, a pressure sensor, a processor, and a radio interface; and
a plurality of servers, the plurality of servers operable to receive communications from the plurality of sensor units, and operable to store data regarding an identification of at least one electric motor of the plurality of electric motors and vibration data of the at least one electric motor of the plurality of electric motors.

16. The system of claim 15 wherein the processor is operable to communicate data from the plurality of sensor units over the radio interface and wherein the plurality of servers are operable to correlate the data from the plurality of sensor units with the data regarding the identification of the plurality of electric motors to analyze failures.

17. A method for monitoring a plurality of electric motors, comprising:
receiving, at a server, data obtained from a plurality of sensor units attached to and mounted on a body of the plurality of electric motors, the plurality of sensor units comprising a vibration sensor, a processor, and a radio interface;
storing, in a database, the data received from the plurality of sensor units;
receiving, at the server, failure data regarding the plurality of electric motors;
comparing, at the database, the failure data and the data received from the sensor units to predict future electric motor failures; and
receiving, by the server, locations of the plurality of electric motors.

18. The method of claim 17 further comprising receiving, by the server, temperature data on the plurality of electric motors.

19. A method for monitoring a plurality of electric motors, comprising:
receiving, at a server, data obtained from a plurality of sensor units attached to and mounted on a body of the plurality of electric motors, the plurality of sensor units comprising a vibration sensor, a processor, and a radio interface;
storing, in a database, the data received from the plurality of sensor units;
receiving, at the server, failure data regarding the plurality of electric motors;
comparing, at the database, failure data and the data received from the sensor units to predict future electric motor failures; and
receiving, by the server, data on electrical current in the plurality of electric motors.

20. The method of claim 19 further comprising receiving, by the server, temperature data on the plurality of electric motors.

* * * * *